United States Patent [19]

Ido

[11] Patent Number: 5,800,613

[45] Date of Patent: Sep. 1, 1998

[54] SEED SUPPLYING MECHANISM IN SEED GEL COATING APPARATUS

[75] Inventor: Yoichi Ido, Shizuoka, Japan

[73] Assignee: Yazaki Corporation, Tokyo, Japan

[21] Appl. No.: 678,054

[22] Filed: Jul. 9, 1996

[30] Foreign Application Priority Data

Jul. 11, 1995 [JP] Japan ................ 7-175244

[51] Int. Cl.⁶ ................................................ B05C 3/00
[52] U.S. Cl. ............... 118/13; 118/20; 118/26; 118/29; 118/30; 118/62; 221/211
[58] Field of Search ............. 118/13, 20, 58, 118/26, 29, 30, 62; 294/64.1; 901/40; 221/211, 278

[56] References Cited

U.S. PATENT DOCUMENTS

| | | |
|---|---|---|
| 3,843,018 | 10/1974 | Holmes et al. ............ 221/211 |
| 4,401,236 | 8/1983 | Germaine ................. 221/211 |
| 5,254,358 | 10/1993 | Kouno et al. . | |
| 5,414,955 | 5/1995 | Morin ..................... 294/64.1 |

FOREIGN PATENT DOCUMENTS

| | | | |
|---|---|---|---|
| 52-58589 | 5/1977 | Japan ................... | 294/64.1 |
| 4-141006 | 5/1992 | Japan . | |
| 4183586 | 6/1992 | Japan ................... | 294/64.1 |
| 5131375 | 5/1993 | Japan ................... | 294/64.1 |
| 5185391 | 7/1993 | Japan ................... | 294/64.1 |

*Primary Examiner*—Laura Edwards
*Attorney, Agent, or Firm*—Finnegan, Henderson, Farabow, Garrett & Dunner, L.L.P.

[57] ABSTRACT

A hollow needle catches each seed in a seed vessel by suction, and a nozzle section receives the seed to form a gel film. An air blow-out nozzle opens toward the tip of the hollow needle. The mechanism includes an air cylinder for elevating the seed vessel, a lowering pipe line and a lifting pipe line each connected to the cylinder, a cylinder operating solenoid valve by way of which the pipe lines communicates with an air pressure source, and a branch pipe line communicating the lowering pipe line with the air blow-out nozzle. Further, air blows out from the air blow-out nozzle as synchronizing with the descent of the seed vessel.

4 Claims, 5 Drawing Sheets

SEED SUPPLYING MECHANISM IN SEED GEL COATING APPARATUS

BACKGROUND OF THE INVENTION

1. Field of the Invention

This invention relates to an improved seed supplying mechanism in a seed gel coating apparatus, particularly to a seed supplying mechanism in which a plurality of comparatively small seeds can be prevented from being simultaneously supplied to a gel film.

2. Description of the Prior Art

This invention is a partial improvement of a seed supplying mechanism in a conventional seed gel coating apparatus. Therefore, the conventional seed gel coating apparatus will be discussed in detail in the following.

Figure 3:
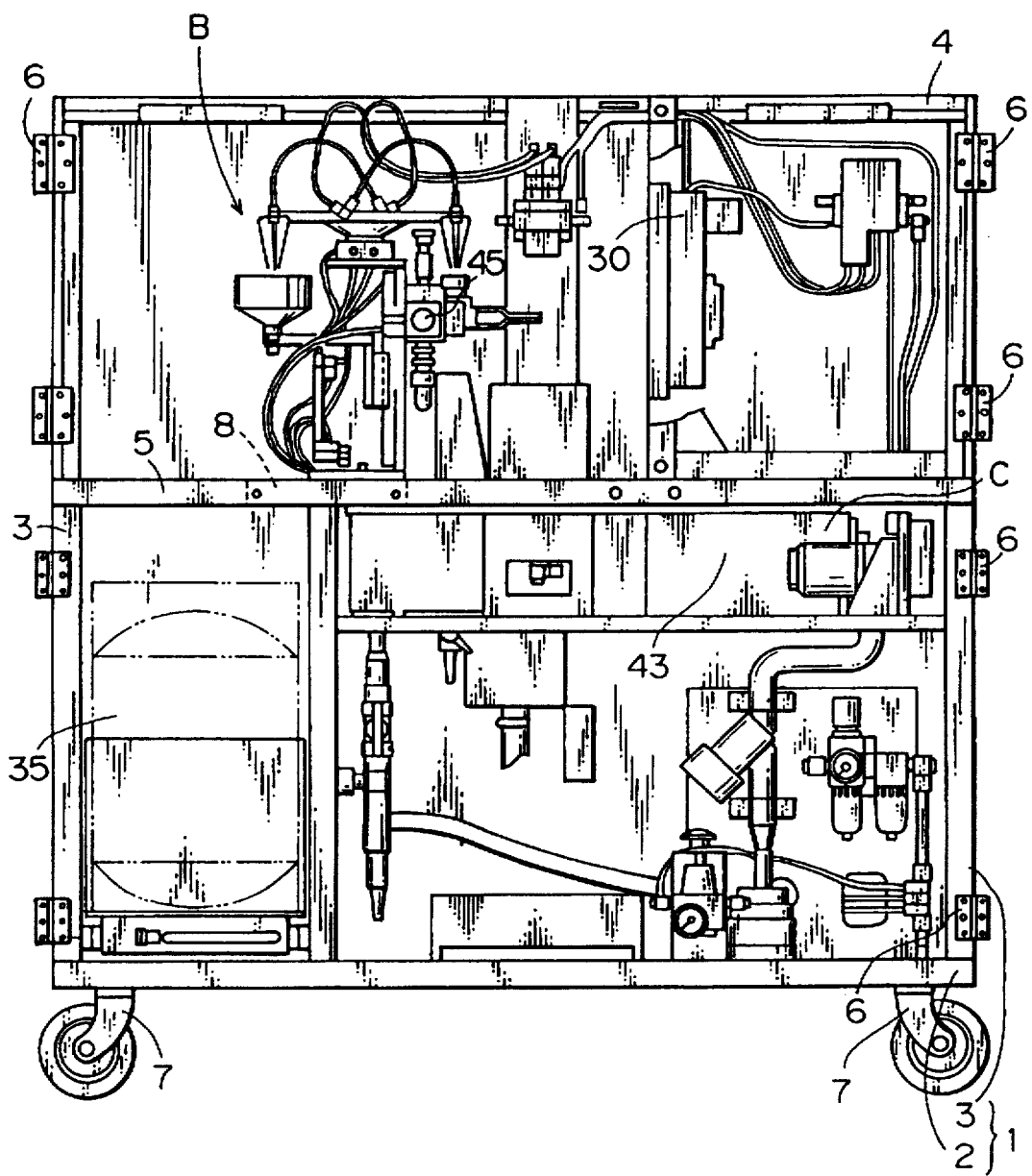

FIG. 3 is a front view of a conventional seed gel coating apparatus having removed a door in order to take a clear inside sight thereof. A casing 1 receiving the seed gel coating apparatus includes a rectangular base plate 2, pillars 3 standing in the four corners of the base plate 2, and an upper beam 4 connected to upper ends of a couple of left and right pillars 3. A ceiling plate is furnished on the upper beam 4; side walls are fitted to fore and rear pillars 3; and a rear wall is attached to the couple of rear pillars 3.

On each middle portion of the couple of left and right pillars 3, is fixed a cross-beam 5 at each end thereof. The cross-beam 5 separates the seed gel coating apparatus into its upper and lower parts.

In the upper compartment above the cross-beam 5, there are provided a nozzle portion A for obtaining a gel film and a seed supplying section B. Meanwhile, in the lower compartment, there is provided a water washing tank C for washing and hardening the gel coated on the seed.

To hinges 6 attached to front left and right pillars 3, there are fitted ends of a door (not shown) for the upper compartment and another door (not shown) for the lower compartment.

On the lower surface of the base plate 2, there is provided a caster 7 for moving the whole gel coating apparatus.

Figure 4:
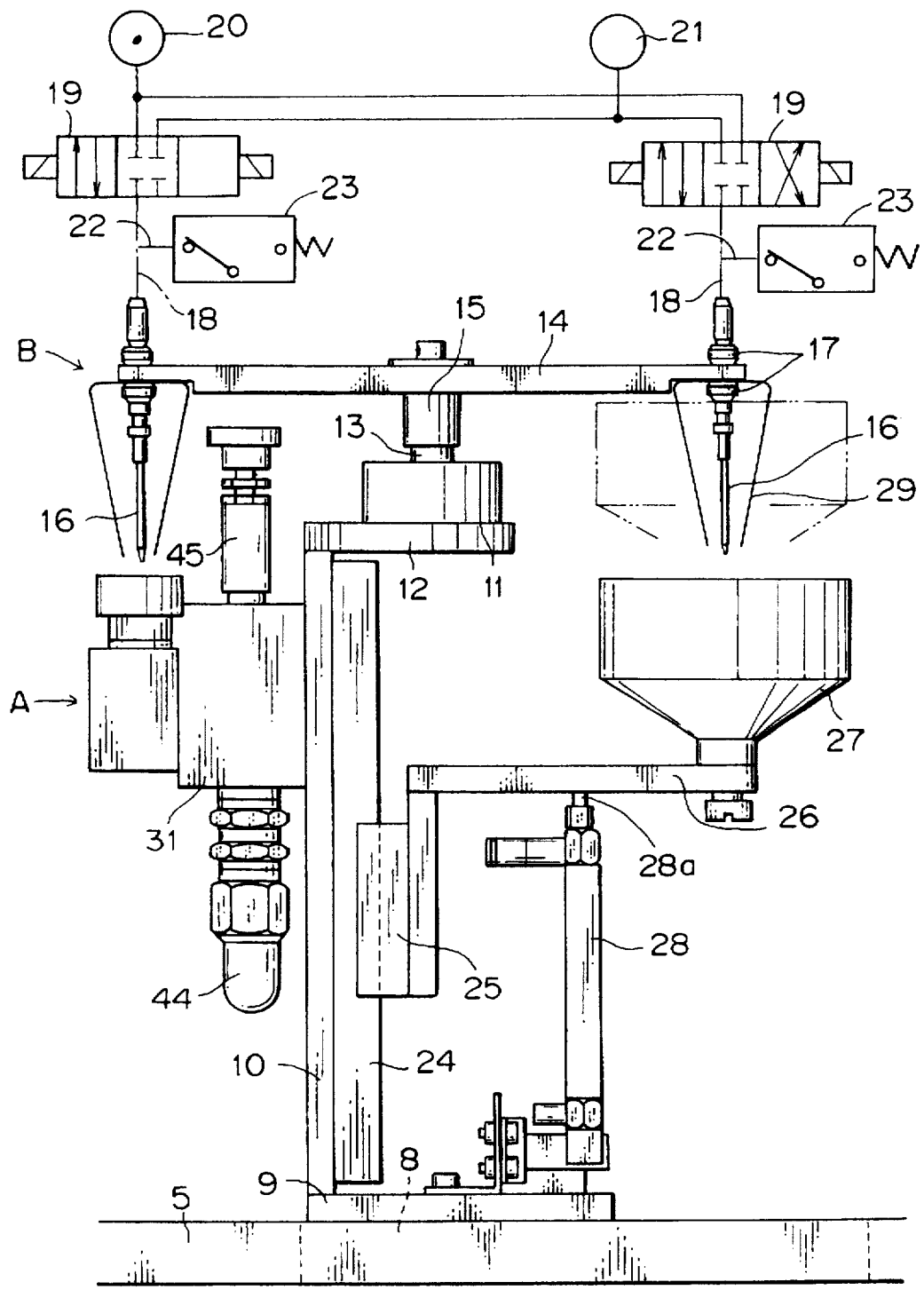

On a connection beam 8 fitted to intermediate portions of the front and rear cross-beams 5, there are mounted the nozzle portion A and the seed supplying section B (refer to FIGS. 3 and 4).

As shown in FIG. 4, on an upper surface of a base plate 9 fixed to the connection beam 8, there stands a support pillar 10.

On the upper end of the support pillar 10, there is fixed a bed plate 12 for supporting a turning gear 11.

The turning gear 11 is an air-driven rotary actuator in which an upwardly extending output shaft 13 turns forwardly and backwardly in the range of 180° by air pressure alternately supplied to a couple of ports.

The output shaft 13 connects to a lower end of a rotating shaft 15 fixed on the middle of the rotating arm 14. A couple of hollow needles 16 inserted in each end of the rotating arm 14 is securely coupled to the rotating arm 14 by a nut 17 screwed to a thread formed in an outer surface of the hollow needles 16.

The inner diameter of the hollow needles 16 is smaller than a seed in order to catch by suction one by one at the lower end of the needle 16.

Around the upper end of the hollow needles 16, there is disposed a pipe line 18 composed of a tube connected to the upper end of the needles 16 and a fixed piping extended from the tube. The pipe line 18 communicates with an air pressure source 20 and a negative pressure source 21 by way of a solenoid valve 19 for the hollow needle 16.

In a branch pipe line 22 from the pipe line 18, there is provided a pressure switch 23 to detect a negative pressure in the pipe line 18.

On one side surface (in the right side of FIG. 4) of the support pillar 10, there is fixed a slide guiding plate 24. On an elevating platform 25 sliding along the slide guiding plate 24, a vessel supporting arm 26 is mounted in a horizontal direction. On the vessel supporting arm 26, there is attached an upwardly opened seed vessel 27 containing a great number of seeds therein and positioned just under the hollow needle 16.

On the base plate 9, there is attached a cylinder 28. The fore end of a piston rod 28a of the cylinder 28 is fixed to the vessel supporting arm 26.

Upper and lower ports provided in the cylinder 28 connect respectively to an upward flow pipe and a downward flow pipe (not shown). Those pipes communicate with an air pressure source 20 by way of a cylinder operating solenoid valve.

Operating the cylinder 28 by the cylinder operating solenoid valve causes that the seed vessel 27 moves up or down between a solid line and a dotted line shown in FIG. 4. When the seed vessel 27 has moved in the upper position, the tip of the hollow needle 16 advances into the great number of seeds in the seed vessel 27 and the hollow needle 16 receives a negative pressure.

The supply of the negative pressure to the hollow needle 16 catches a seed by suction, which increases the negative pressure in the hollow needle 16 and the pipe line 18. This makes a suction pressure switch 23 confirm the fact that the hollow needle 16 has caught a seed. Next, the seed vessel 27 moves downward, and the rotating arm 14 turns by 180° to stop just above a nozzle portion A. Then, the hollow needle 16 receives a pressurized air, so that the seed having been caught drops in the nozzle portion A.

Meanwhile, when the hollow needle 16 has advanced between seeds but has not succeeded to catch a seed, the seed vessel 27 repeats the up-and-down movement till the hollow needle 16 catches a seed.

In order that the hollow needle 16 can easily catch a seed, a seed stirring member 29 extending in each side of the hollow needle 16 is attached to the rotating arm 14.

The advancement of the seed stirring member 29 into the seed vessel 27 along with the hollow needle 16 moves seeds in the seed vessel 27. Thereby, the hollow needle 16 can catch a seed moved near the tip of the hollow needle 16 by the seed stirring member 29.

The seed supplying section B catching a seed in the seed vessel 27 to supply the seeds to the nozzle section A is substantially constructed as mentioned above.

The turning gear 11, the solenoid valve 19 for the hollow needle 16, the another solenoid valve for the cylinder 28, and the nozzle section A discussed hereinafter are controlled by a control section 30 (refer to FIG. 3).

Figure 5:
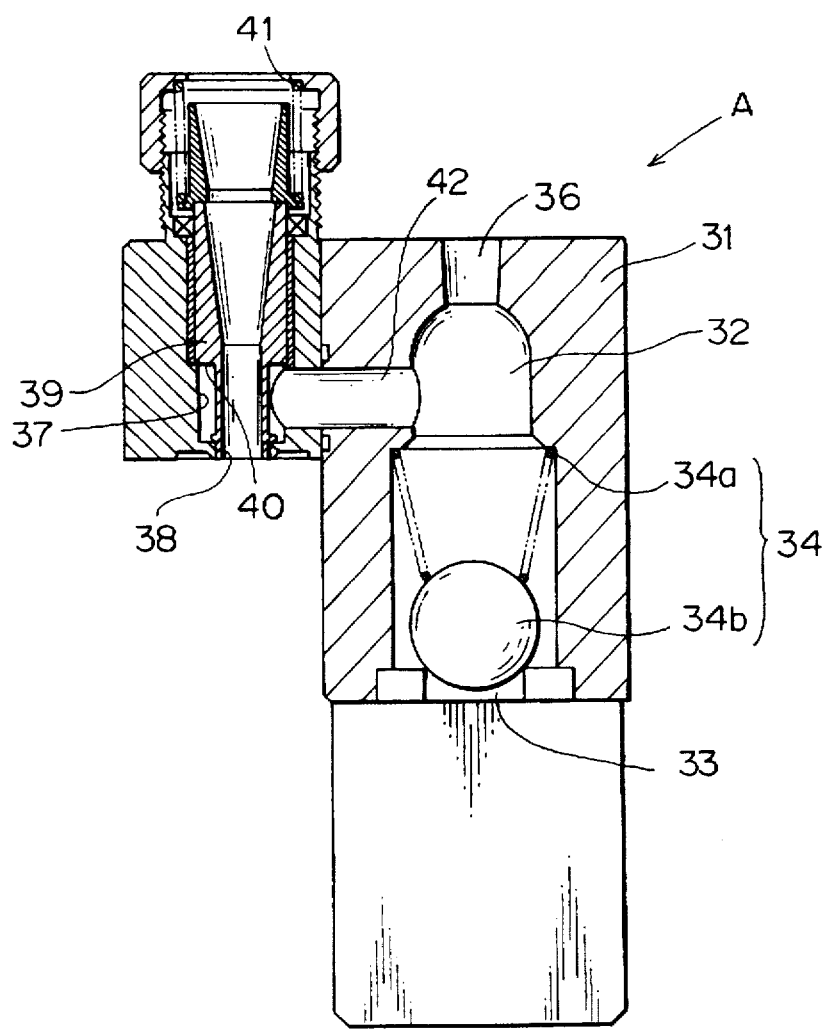

In the nozzle section A, a nozzle case 31 attached to the other side surface (in the left side of FIG. 4) of the support pillar 10 is provided with a receiving chamber 32 for a gelling agent (refer to FIG. 5). Between the gelling agent receiving chamber 32 and a lower opening 33, there is provided a check valve 34 composed of a spring 34a and a steel ball 34b(refer to FIG. 5).

A pipe 44 (refer to FIG. 4) connected to the opening 33 communicates with a storage tank 35 for the gelling agent (refer to FIG. 3).

The receiving chamber 32 for the gelling agent has a through hole (not shown) for receiving pressure from a pressurizing plunger 45 (refer to FIG. 3).

A plunger receiving hole 37 vertically passing through the nozzle case 31 locates right under the hollow needle 16. The plunger receiving hole 37 has a valve seat 38 at the lower end thereof. A cylindrical cutting plunger 39 received in the receiving hole 37 composes a valve to open and close the seat 38 at the lower end of the plunger. An intermediate outer surface of the plunger serves as a pressure receiving face 40.

The cutting plunger 39 has a spring 41 for resiliently downwardly biasing the plunger 39, which has been normally closing the seat 38.

The plunger receiving hole 37 communicates with the receiving chamber 32 for the gelling agent by way of a gelling agent passage 42. Thereby, when a pressurizing plunger 45 pressurizes the gelling agent in the receiving chamber 32, the gelling agent puts pressure on the pressure receiving face 40 so that the cutting plunger 39 ascends against the spring 41 to open the valve. As a result, the gelling agent flows out from the lower end of the plunger receiving hole 37, which forms a gel film.

When the gel film draws down gradually by its weight, the seeds dropped from the hollow needle 16 are supplied into the gel film.

Figure 1:
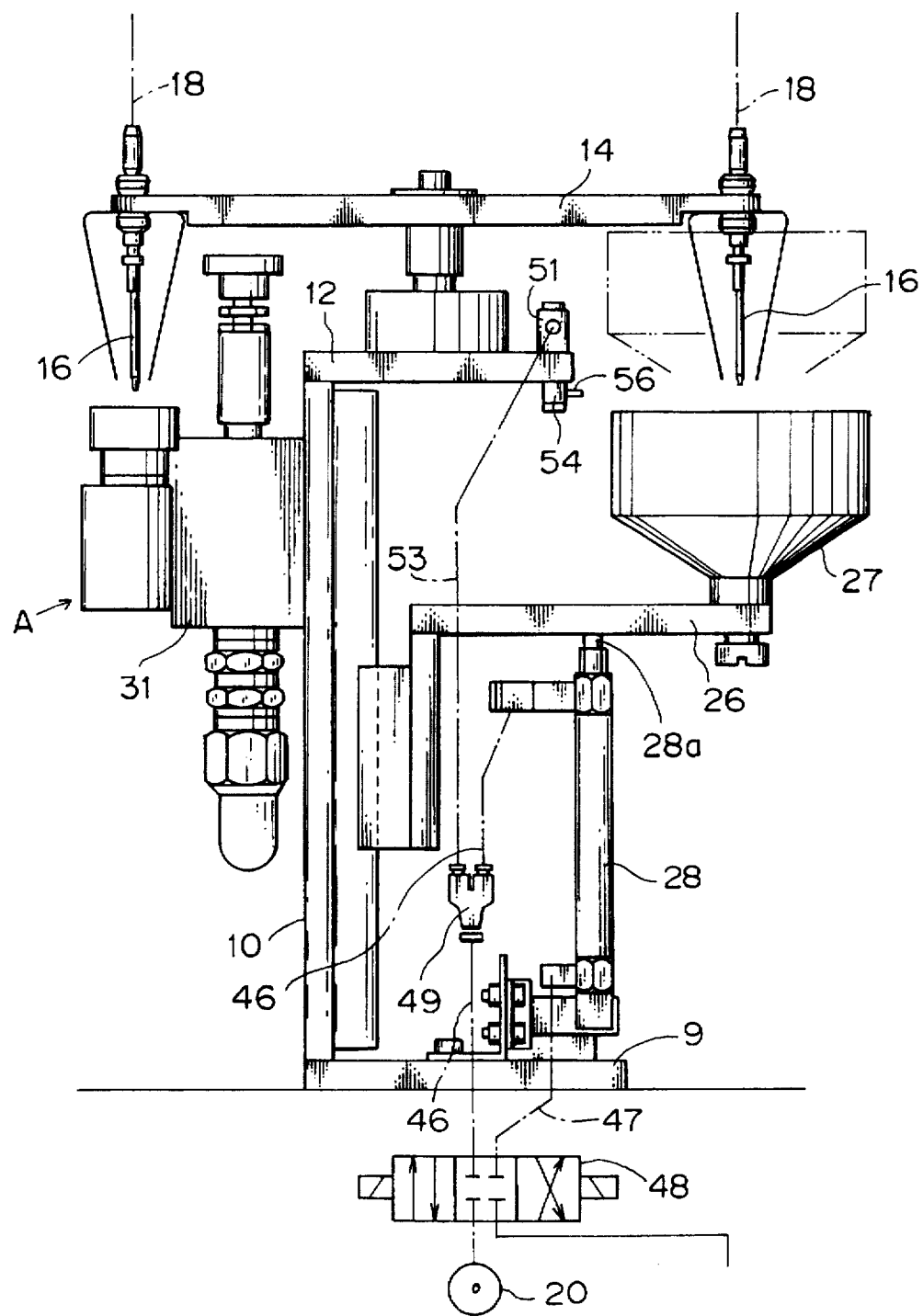

By reopening the valve, a gel flown out from the plunger receiving hole 37 coats an opening portion of the drawn-down gel film. Next, by closing the valve, the gel coated seed that can not bear itself in weight drops downward and becomes spherical during falling by surface tension force. Then, the gel coated seed is delivered into a hardening and washing tank 43 (refer to FIG. 3) disposed in a lower compartment.

The tank 43 contains a hardening liquid. After the surface layer has been hardened by the hardening liquid, the gel coated seed is delivered into a washing compartment of the tank. Thereby, the hardening liquid built-up on the surface of the gel coated seed is washed off and the gel coated seed flows out from the washing compartment.

As discussed above, the seed supplying section B catches and supplies seeds one by one to the nozzle section A; the nozzle section A coats the seeds with the gel; the spherical surface of the gel coated seed is hardened by the hardening liquid; and the surface is washed by water. These operations are automatically continuously carried out as controlled by the control section 30. However, in case that the seeds are considerably small ones of vegetables or flower plants, two or three seeds are simultaneously caught on the tip of the hollow needle 16. This causes that a gel coated seed pack including a plurality of seeds is produced, which has brought about the drawback that young plants grown from a gel coated seed pack including a plurality of seeds requires thinning-out work in the field having been sowed with the seed pack.

SUMMARY OF THE INVENTION

In view of the drawback, an object of this invention is to provide an improved seed supplying mechanism in a seed gel coating apparatus in which a plurality of comparatively small seeds can be prevented from being simultaneously supplied to a gel film, preferably, with a minimum additional installation cost. For achieving the object, this invention provides a seed supplying mechanism in a seed gel coating apparatus including a gel coating section receiving each seed to form a gel film thereon, the mechanism comprising;

a hollow needle catching each seed in a seed vessel by suction, and an air blow-out nozzle opening toward the tip of the hollow needle.

Further, the seed supplying mechanism may comprise, an air cylinder for elevating the seed vessel, a lowering pipe line and a lifting pipe line each connected to the cylinder, a cylinder operating solenoid valve by way of which the pipe lines communicates with an air pressure source, a branch pipe line communicating the lowering pipe line with the air blow-out nozzle, wherein air can blow out from the air blow-out nozzle as synchronizing with the descent of the seed vessel.

In the seed supplying mechanism in a seed gel coating apparatus having the above-mentioned structure, the tip of the hollow needle catches a seed, when the hollow needle advances into seeds in the seed vessel.

Normally, only one seed is caught by the tip of the hollow needle 16. However, a plurality of seeds may be caught at a time. Even in such a case, one seed has been stuck more strongly than the other ones by the suction tip of the hollow needle 16. The other ones has received extremely less suction force.

Air blows out toward the tip of the hollow needle having been drawn out from the seed vessel, after the suction of seeds. Thereby, the only one seed having been stuck more strongly can bear the air-blow to remain at the tip of the hollow needle 16 to be supplied into a gel film, while other seeds having been stuck by less force are blown off.

Where the blow-out nozzle has communicated with the branch pipe line provided in the lowering pipe line connected to the cylinder for elevating the seed vessel, operation of the cylinder operating solenoid valve causes air blowing-out from the blow-out nozzle simultaneously with the descent of the seed vessel.

This has an advantage that the cylinder operating solenoid valve is commonly used for the blow-out nozzle. Thereby, no additional solenoid valve is required, which does not cause a complicated seed supplying mechanism in a seed gel coating apparatus and realizes the advantage with little increased cost.

BRIEF DESCRIPTION OF THE DRAWINGS

FIG. 1 is a front view of a seed supplying mechanism in a seed gel coating apparatus according to this invention;

FIG. 2 is a front view partially in section of an air blow-out nozzle and its periphery according to the present invention;

FIG. 3 is a front view of a seed gel coating apparatus;

FIG. 4 is a front view of a seed supplying mechanism in a seed gel coating apparatus in a prior art; and FIG. 5 is a longitudinal sectional view of a nozzle section in the prior art.

DETAILED DESCRIPTION OF PREFERRED EMBODIMENTS

This invention is an improvement in the seed supplying mechanism in the seed gel coating apparatus discussed in the prior art. Constructions differed from the prior art will be discussed in detail as referring to the accompanied drawings. The same components as the prior art are designated as the same numerals and their detail discussion will be omitted .

As shown in FIG. 1, in a similar way as the prior art, on a base plate 9, there is attached a lower end of a cylinder 28 having an upwardly directed piston rod 28*a* and a fore end of the piston rod 28*a* is fixed to a vessel supporting arm 26.

A lowering flow pipe 46 connected to a downward port provided on the cylinder 28 and a lifting flow pipe 47 connected to an upward port provided on the cylinder 28 communicate with an air pressure source 20 by way of a cylinder operating solenoid valve 48. Operating of the cylinder operating solenoid valve 48 elevates a seed vessel 27 with a piston rod 28a. In the lowering flow pipe line 46, between the downward port on the cylinder 28 and the cylinder operating solenoid valve 48, there is provided a branching pipe joint 49 for connecting a branch pipe (refer to FIG. 1).

A right end portion of a bed plate 12 has a threaded through hole 50 into which a threaded pipe 52 provided in an air flow control valve 51 is screwed from the upper side of the bed plate 12. A branch pipe line 53 connected to the air flow control valve 51 connects to the branching pipe joint 49. Meanwhile, an air blow-out nozzle 54 attached to a lower surface of the bed plate 12 has a threaded pipe 55 screwed to the threaded trough hole 50 and a blow out pipe 56. The blow out pipe 56 is open toward the tip of the hollow needle 16 (refer to FIG. 2).

The other construction of the seed supplying mechanism in a seed gel coating apparatus is the same as those of the prior art.

Next, the operation of the seed supplying mechanism in a seed gel coating apparatus having such construction will be discussed.

The rotating arm 14 turns until both the hollow needles 16 comes respectively just above the nozzle section A or just above the seed vessel 27. Operating of the cylinder operating solenoid valve 48 delivers an air pressure to the lifting flow pipe 47, which raises the seed vessel 27 with the piston rod 28a. Thereby, the tip of the hollow needle 16 advances into a lot of seeds in the seed vessel 27.

Next, operating of the solenoid valve 19 (refer to FIG. 4) for the hollow needle 16 communicates the inside of the hollow needle 16 with the negative pressure source. Thereby, the tip of the hollow needle 16 catches a seed S (refer to FIG. 2).

The seed S caught by the hollow needle 16 increases the negative pressure in the pipe line 18 and the suction pressure switch 23 (refer to FIG. 4) confirms the catch of the seed. After the seed S has been caught, operating of the cylinder operating solenoid valve 48 delivers an air pressure to the lowering pipe line 46 and the branch pipe line 53. Air blows out from the blow out pipe 56 in the air blow-out nozzle 54 along with the descending of the seed vessel 27.

Figure 2:
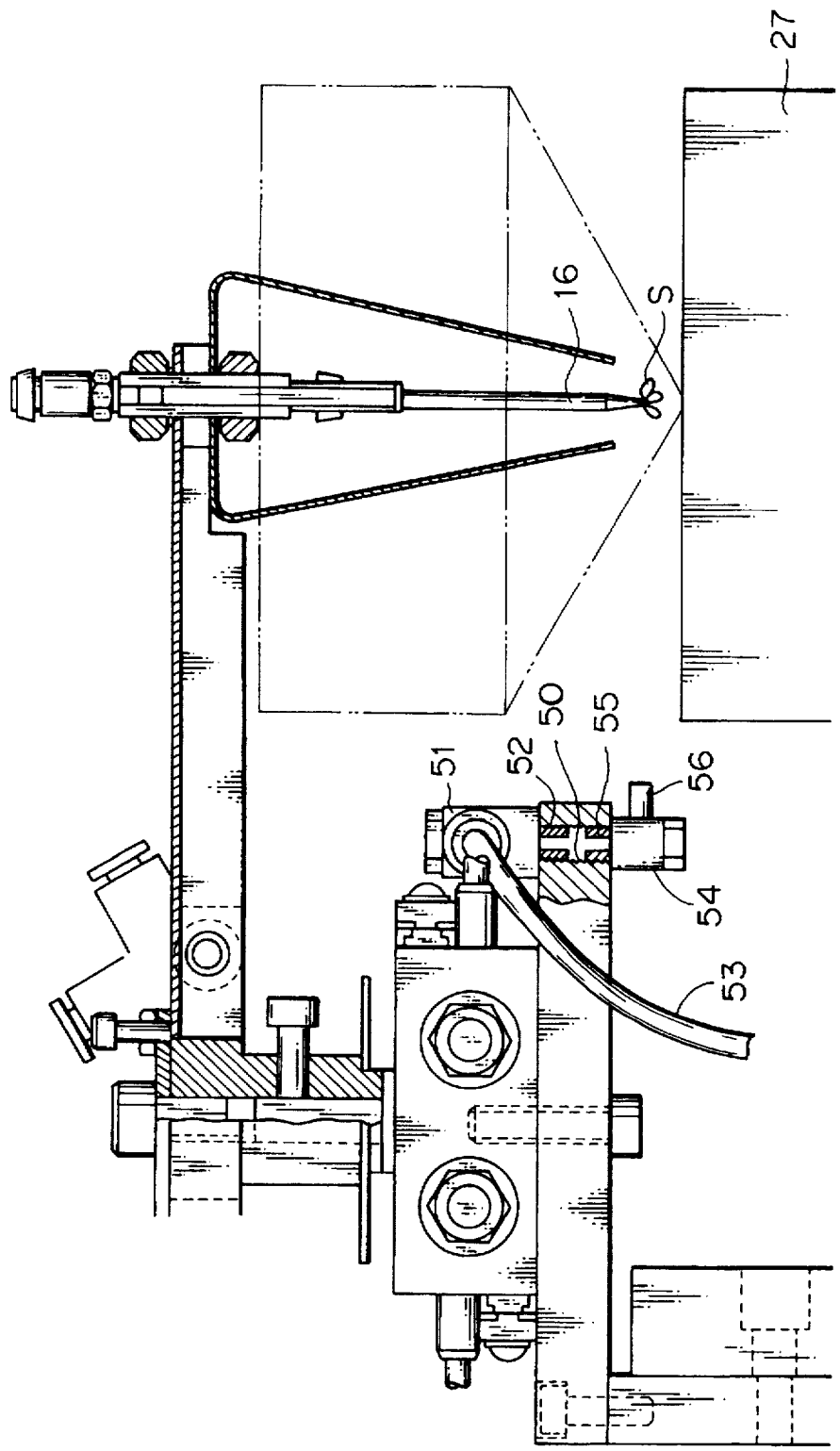

Normally, only one seed S is caught at the tip of the hollow needle 16. As shown in FIG. 2, in case of a plurality of seeds having been caught at a time by the suction tip of the needle 16, one seed S has been stuck more strongly than the other ones by the hollow needle 16.

The air flow control valve 51 controls the air pressure so that the air blown out from the air blow-out nozzle 54 can not blow off the only one seed S have been more strongly stuck. Thereby, the only one seed remains at the tip of the hollow needle 16, while the other seeds having stuck by less force are blown off.

After the seed vessel 27 has descended, the hollow needle 16 having caught the seed S locates just above the cutting plunger 39 in the nozzle section A. Next, operating of the solenoid valve 19 for the hollow needle 16 delivers air pressure to the hollow needle 16. Thereby, the seed S drops to be supplied into a drawn-out gel firm formed in the nozzle section A.

Meanwhile, the other hollow needle 16 is catching another seed S.

As discussed above, gel coated seeds having only one seed S in a gel firm can be continuously automatically produced. The use of the cylinder operating solenoid valve 48 for the air blow-out nozzle 54 can blow out air from the air blow-out nozzle 54 synchronized with the descent of the seed vessel 27.

Without the common use of the cylinder operating solenoid valve 48, an additional solenoid valve only for the air blow-out nozzle 54 may also prevent a plurality of seeds from simultaneously being supplied.

However, this has a disadvantage that the construction of the seed supplying mechanism in a seed gel coating apparatus is more complicated and causes an additional cost thereof.

The construction of this invention is able to eliminate the drawback in the prior art that a plurality of seeds are supplied into one gel film, which requires little increase in manufacturing cost in comparison with the seed supplying mechanism in the seed gel coating apparatus in the prior art. Accordingly, no thinning-out work of young plants grown from a gel coated seed pack is required.

What is claimed is:

1. A seed supplying mechanism in a seed gel coating apparatus comprising:

a seed vessel;

an air cylinder for elevating and lowering said seed vessel;

a lowering pipe line and a lifting pipe line each connected to said air cylinder;

a cylinder operating solenoid valve by way of which said pipe lines communicate with an air pressure source;

a hollow needle disposed above said seed vessel having a tip for catching a seed in said seed vessel by suction;

a negative pressure source connected to said hollow needle to provide said suction;

an air blow-out nozzle opening toward the tip of said hollow needle; and a branch pipe line communicating said lowering pipe line with said air blow-out nozzle;

wherein air blows out from said air blow-out nozzle synchronized with the lowering of said seed vessel.

2. A seed supplying mechanism in a seed gel coating apparatus as claimed in claim 1 further comprising:

an air-flow control valve connected to said branch pipe line for controlling air flow rate in said air blow-out nozzle.

3. A seed supplying mechanism in a seed gel coating apparatus as claimed in claim 1 further comprising:

an air-flow control valve connected to said branch pipe line for controlling air flow rate in said air blow-out nozzle, wherein the control range of the air-flow control valve includes a flow rate in which said hollow needle can hold only one seed even when a plurality of seeds have been simultaneously caught by said hollow needle.

4. A seed supplying mechanism in a seed gel coating apparatus, comprising:

a seed vessel;

an air cylinder for elevating and lowering said seed vessel;

a lowering pipe line and a lifting pipe line, each connected to said air cylinder;

a first solenoid valve by way of which said pipe lines communicate with an air pressure source;

a hollow needle disposed above said seed vessel having a tip for catching a seed in said seed vessel by suction;

a negative pressure source connected to said hollow needle to provide said suction;

an air blow out nozzle opening toward the tip of said hollow needle; and a second solenoid valve by way of which said air blow-out nozzle communicates with the air pressure source;

wherein air blows out from said air blow-out nozzle synchronized with the lowering of said seed vessel.

* * * * *